United States Patent Office 3,829,301
Patented Aug. 13, 1974

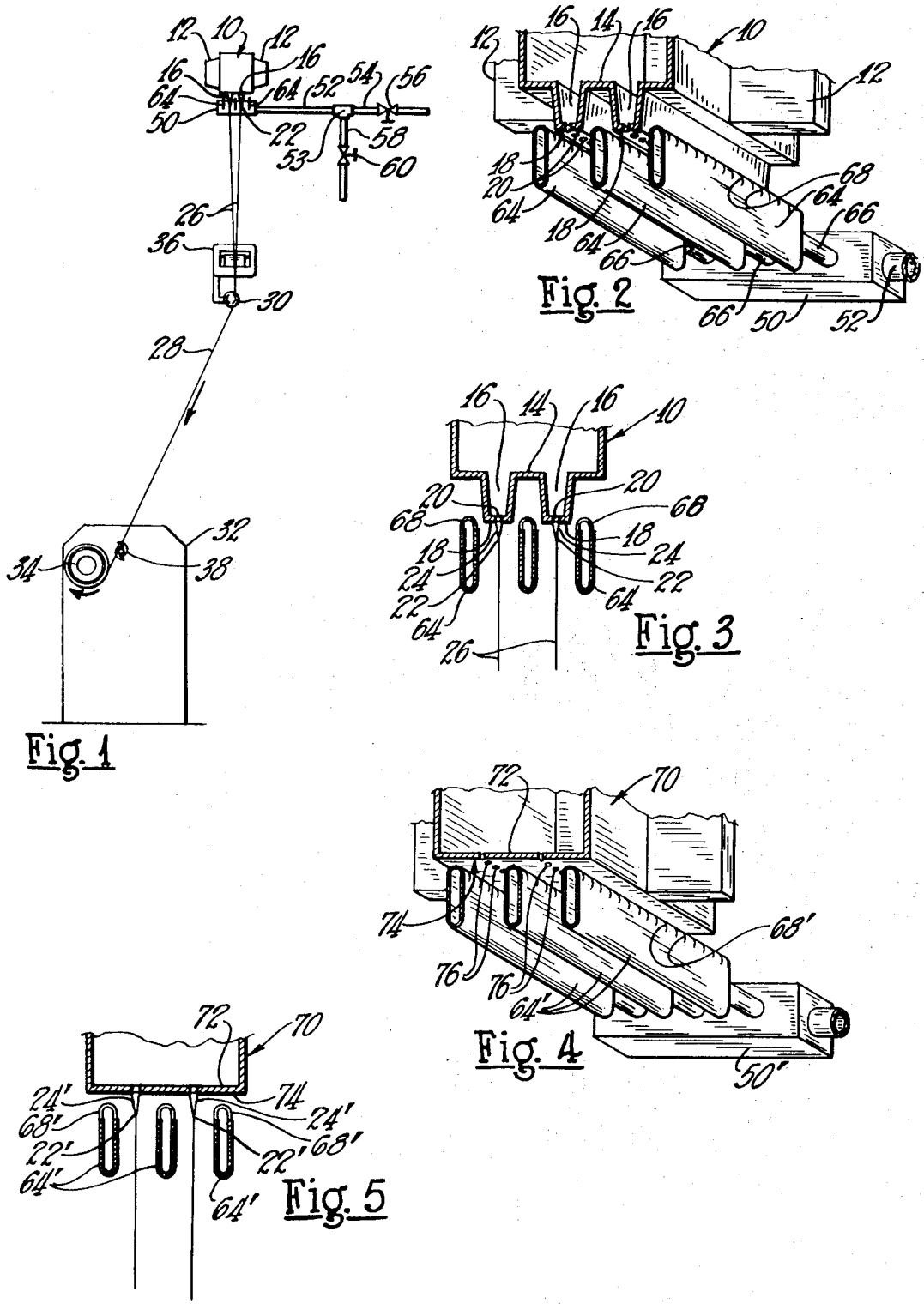

3,829,301
METHOD FOR PREVENTING FLOODING OF GLASS FIBER BUSHINGS
Robert G. Russell, Granville, Ohio, assignors to Owens-Corning Fiberglas Corporation
Continuation-in-part of application Ser. No. 123,637, Mar. 12, 1971, which is a continuation-in-part of application Ser. No. 14,726, Feb. 24, 1970, which in turn is a continuation of application Ser. No. 628,997, Apr. 6, 1967, all now abandoned. This application Mar. 21, 1973, Ser. No. 343,588
Int. Cl. C03b 37/02
U.S. Cl. 65—2
31 Claims

ABSTRACT OF THE DISCLOSURE

This invention relates to processing heat-softenable material, such as glass, involving treatment of a surface of a body or substrate at which the heat-softened material is present, such as the surface at the stream delivery region of a feeder, and pertains particularly to a method and arrangement establishing an environment at the surface of a character providing an interfacial condition promoting separation of the material from the surface thereby minimizing or eliminating the tendency for the material to flood at the surface by use of carbon or hydrogen in a protective inert atmosphere.

---

This is a continuation-in-part of application Ser. No. 123,637, filed Mar. 12, 1971, which is a continuation-in-part of application Ser. No. 14,726, filed Feb. 24, 1970, which is a continuation of application Ser. No. 628,997, filed Apr. 6, 1967, all now abandoned.

This invention relates to a method of and apparatus for establishing an environment involving treatment of a surface of a body or substrate at which heat-softened material is present as at the stream flow section of a stream feeder for flowing streams of glass or other heat-softened material from the feeder, and pertains more especially to the provision of an environment at the surface of a character promoting separation of the material from the surface to prevent or minimize flooding of the material and effecting isolation of the streams of glass or other material, one from another, to foster improved attenuation of the material to filaments or fibers or for other purposes where separation of a heat-softened material from a surface is desirable.

In the formation of fibers or filaments from heat-softened glass it has been a practice to flow a plurality of streams of glass from a supply contained in a stream feeder or bushing through passages or orifices in spaced projections integral with and depending from the floor of a feeder in order to provide individual streams which may be attenuated to continuous filaments by winding the filaments or a strand of the filaments on a rotating collector, such filaments being formed or attenuated at speeds of ten thousand or more feet per minute. In initiating attenuation, beads of glass are formed at the delivery orifices and each bead, on reaching a weight sufficient to overcome the surface tension of the glass, falls by gravity with a trailing filament.

Heretofore it has been found essential in conventional glass filament forming systems or methods to provide individual or independent projections, each having an orifice through which flows a stream of glass. The metal of the feeder and the projections must be capable of resisting the high temperature of the molten glass, and platinum and platinum alloys have been successfully used. The provision of the projections individual for each stream tend to retard or impede the glass from wetting or flooding the surface of the stream delivery region of the bushing or feeder. The use of orificed projections depending from a feeder reduces the tendency for the glass to flood over the surface of the feeder but at times the glass will flood along the obverse surface of the feeder resulting in interruption of attenuation.

Flooding is attributed to the tendency of molten glass to wet the platinum alloy surface, the glass readily spreading over the wetted surface. In bushing or stream feeder constructions wherein appreciable space is provided between adjacent projections, the liability for the glass to flood is minimized.

The trend, however, is toward the simultaneously attenuation of a large number of streams of glass from a single feeder to provide a strand having a large number of filaments. In such arrangements the adjacent projections must be in close relation in order to provide the desired number of streams and a structural arrangement of this character increases the tendency of the molten glass to migrate or flood along the adjacent metal surface because the tendency of the molten glass to wet the metal surface is greater than its tendency to cohere into a drop or bead formation.

The invention embraces a method of processing or controlling heat-softened material, such as glass, involving establishing an enviromnent in a region at which heat-softened material is present at the surface of a substrate wherein the environment is inclusive of a gas which, at the temperature of the heat-softened material, is effective at the interfacial region of the substrate with the heat-softened material to promote separation of the heat-softened material from the substrate.

The invention embraces a method of controlling heat-softened material, such as glass, wherein streams of the softened material are flowed from orifices in a surface and wherein the material has a tendency to spread over the surface, the method involving the provision of an environment in the stream delivery region of the surface effective to substantially reduce the size of the beads of glass at the orifices during start up and substantially reduce the tendency for the softened material to spread over the surface whereby the stream flow orifices may be disposed more closely to obtain an increased number of streams from a given area and thereby increase the production of filaments attenuated from the streams and reduce the size of the stream feeder of platinum or platinum alloy thereby effecting substantial savings in platinum and a consequent reduction in the cost of producing filaments.

An object of the invention embraces a method of processing or controlling heat-softened glass involving establishing an environment in a region at which heat-softened glass is present at the surface of a substrate wherein the environment is inclusive of a gas which, at the temperature of the heat-softened glass, is effective in promoting separation of or separating the glass from the substrate.

The invention embraces a method of processing or controlling heat-softened glass involving the establishment of an environment at a region in which heat-softened glass is present at the surface of a substrate, wherein the environment includes one or more constituents or elements having the characteristics, at the temperature of the heat-softened glass, of establishing a condition in which the glass acts or behaves as if its wetting angle in relation to the substrate were increased, and accordingly to reduce or substantially eliminate the wetting of the substrate by the heat-softened glass to promote the separation of or actually separating the heat-softened glass from the substrate.

An object of the invention embraces a method of establishing a comparatively inert environment in the region of delivery of glass streams from a stream feeder and feeding a volatile, heat-decomposable compound to the environment and decomposing the compound at the feeder surface under the influence of heat from the glass and the feeder providing a gas of a character tending to promote separation of or separating the molten glass at the interface with the feeder and thereby substantially eliminating the tendency for the glass to flood at the stream delivery region of the feeder.

An object of the invention embraces a method involving the establishment of a gaseous environment at the region of delivery of streams of glass from a stream feeder of a chaarcter substantially eliminating or minimizing the tendency for the glass to flood the surface of the feeder adjacent the glass streams.

Another object of the invention resides in a method involving the establishment of a substantially inert environment at the region of delivery of glass streams from a feeder wherein the environment contains hydrogen or a compound from which hydrogen is evolved by pyrolytic decomposition whereby the hydrogen at the interfacial region of the glass with the feeder surface promotes separation of the glass from the surface thereby minimizing or eliminating the tendency for the glass to wet the surface and thus effectively reduce or eliminate the tendency for the glass to flood at the feeder surface.

Another object of the invention embraces a method of delivering an inert gas and a comparatively small amount of an organic or hydrocarbon gas or gas having a hydrogen constituent in the region of glass streams and the surface of the stream flow section of a stream feeder whereby the organic or hydrocarbon gas or other gas containing hydrogen is decomposed by the intense heat providing decomposition products at the surface areas of the stream feeder at the stream flow section whereby to eliminate or reduce to a minimum the tendency for the glass to spread or flood at the feeder surface.

Another object of the invention is the provision of an environment at the glass stream delivery region of a stream feeder or bushing comprising a substantially inert or non-oxidizing gas and a gas of a character which when subjected to the high temperature at the stream delivery region of the feeder is decomposed and the decomposition products including carbon rendering the feeder or bushing surface substantially immune to wetting by glass whereby to prevent flooding and promote successful attenuation of the streams to filaments.

Another object of the invention embraces the provision of a medium at the stream delivery region of a glass stream feeder which is substantially nonwettable by glass enabling the delivery of a comparatively large number of individual glass streams in close relation from a small area of stream feeder.

Another object of the invention resides in an arrangement for feeding streams of heat-softened glass and establishing an environment at the stream flow area of a feeder providing a carbonaceous media at the feeder surface area substantially eliminating wetting of the feeder surface by the glass.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 1 is a schematic view of an arrangement for delivering streams of glass and attenuating the streams to filaments, the arrangement including means for establishing an environment at the stream delivery region of the feeder for carrying out the method of the invention;

FIG. 2 is an isometric view of one form of apparatus for delivering a medium adjacent the feeder and glass streams effective to provide an environment impeding flooding of the glass;

FIG. 3 is a transverse sectional view of the apparatus shown in FIG. 2;

FIG. 4 is an isometric view of another form of stream feeder and an arrangement for establishing an environment providing nonwetting characteristics for the feeder surface;

FIG. 5 is a transverse sectional view of the arrangement shown in FIG. 4;

Figure 6:
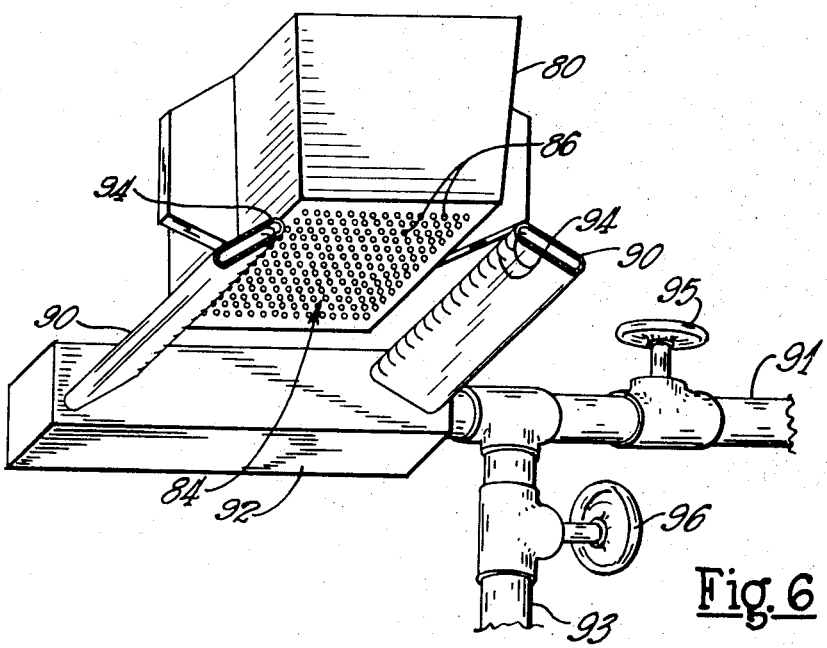
FIG. 6 is an isometric view of the stream delivery section of a glass feeder illustrating a planar feeder area provided with closely spaced stream orifices in association with means for establishing a nonwetting environment at the stream delivery section.

While the method of the invention is especially adapted for use with a feeder or substrate provided with a plurality of orifices for flowing streams of glass to eliminate or greatly reduce the tendency for the glass to flood, it is to be understood that I contemplate utilizing the method in establishing an environment of the character disclosed at the interfacial region of heat-softened material with a surface wherever it is desired to reduce the tendency for the material to spread over the surface and promote a separation of the material from the surface.

Referring to the drawings in detail and initially to FIG. 1, there is illustrated a stream feeder or bushing 10 adapted to contain heat-softened mineral material such as glass. The feeder 10 may be supplied with molten or heat-softened glass from a melter or the feeder may be associated with a forehearth to receive glass in a conventional manner from the forehearth. The feeder is fashioned of a metal or alloy capable of withstanding the high temperatures of molten glass, an alloy of platinum and rhodium being satisfactory for the purpose.

The feeder 10 is provided with terminal lugs 12 for connection with current supply conductors (not shown) for passing electric current through the feeder to maintain the glass in the feeder at the desired temperature and viscosity for flowing streams of glass from the feeder. One form of the feeder 10 is particularly illustrated in FIGS. 2 and 3 and is inclusive of a floor section 14 shaped or configurated to provide channels or longitudinal recesses 16 in substantial parallelism, the floor section 18 of each of the channels being of planar shape and each floor section provided with a plurality of passages, openings or orifices 20 through which streams of glass are delivered from the feeder 10.

The glass streams 22 flow from the orifices and the glass of each stream adjacent the stream delivery surface of the feeder is in the form of a cone 24 shown in FIG. 3. As shown in FIG. 1, the glass streams from the orifices are simultaneously attenuated to filaments 26, the filaments being converged to a strand 28 by a gathering shoe 30. A winding machine 32 is equipped with a rotatable collet 34 driven by a motor (not shown), the strand 28 being wound into a package on a thin-walled tube mounted on the collet 34, the winding collet being rotated at a speed to attenuate the streams to filaments at a linear rate of upwards of ten thousand or more feet per minute.

An applicator 36 may be disposed in advance of the gathering shoe 30 for applying sizing or other coating material onto the filaments prior to their convergence into a strand. A rotatable and reciprocable traverse 38 engages the strand for distributing the strand lengthwise of the collet 34 and for oscillating the strand to effect a crossing of individual wraps or convolutions of strand during collection of the strand into a package. The traverse means may be of conventional character.

The invention embraces a method and apparatus for establishing an environment adjacent the streams and the stream flow surface areas of the stream feeder 10 to substantially eliminate or minimize the tendency of the glass to migrate or flood across the surfaces 18 of the feeder and to effectively isolate the streams one from another whereby the streams may be successfully attenuated into continuous filaments and whereby restarting of attenuating operations may be rapidly resumed following a filament "breakout."

The method of the invention involves delivering or feeding a gas or gases to the stream delivery region of a stream feeder or orificed substrate to establish an environment providing an interfacial condition at the surface of the feeder or substrate fostering separation of the glass from the surface which is effective to minimize or substantially eliminate wetting of the surface by the glass and thereby greatly reduce or elminate the tendency of the glass to flood at the surface and promote separation and isolation of beads of glass forming at the orifices during start-up of attenuation of the streams to discrete fibers or filaments.

The environment is of a substantially nonoxidizing character and provides a region in which an element or gas is present or is formed which is effective at the glass interface to separate the glass from the feeder or substrate surface. Tests have shown that an element or gas adsorbable onto the feeder or substrate surface provides the interfacial condition or cushion resisting wetting of the surface by the glass. One example of successful operating conditions involves the establishment of a nonatmospheric environment by feeding or delivering carbon dioxide to the stream flow region and feeding or delivering a small percentage of a hydrocarbon or organic gas such as propane $(C_3H_8)$ to the environment. The propane may be premixed with the carbon dioxide or introduced separately into the environment.

It is found that the propane in the nonatmospheric or substantially nonoxidizing environment is not burned but is decomposed by heat from the stream feeder and the molten glass, the pyrolysis resulting in decomposition products including hydrogen and carbon. The stream feeder or substrate is usually fashioned of an alloy of platinum and rhodium and, based on tests and observations, it appears that the hydrogen is adsorbed onto the feeder or substrate surface to an extent fostering a separation of the glass at the glass-metal interface. The hydrogen gas appears to provide a "gas cushion" effect at the interface resisting wetting of the surface by the glass and substantially eliminating or greatly reducing the tendency for the glass to flood the substrate surface embraced in the environment containing adsorbable hydrogen. The pyrolytic decomposition of the hydrocarbon, propane, provides carbon in a form of a thin layer or film adsorbed on the surface of the feeder or substrate which is substantially nonwettable by the heat-softened glass providing a factor in the environment reducing the tendency of flooding of the glass. As hereinafter explained, other gases are usable in establishing an environment at a stream feeder or substrate surface of a character establishing an interfacial condition promoting the separation of the glass from the surface and thereby eliminating or reducing tendency for flooding of the feeder or substrate surface.

FIGS. 1, 2 and 3 illustrate a form of apparatus for feeding or delivering a gas or gases to the region of the glass stream flow area or surfaces 14, 16 of the stream feeder 10 and embracing the cones 24 of the glass streams. Disposed adjacent the stream feeder 10 is a manifold 50 provided with a supply pipe 52. The pipe 52 is connected through a T or fitting 53 with a pipe 54 which receives a gas from a supply (not shown) such as carbon dioxide for establishing the nonatmospheric environment. An adjustable valve 56 is provided for regulating or controlling the delivery of carbon dioxide to the region of the stream feeder.

A tube or pipe 58 is joined through the T 53 with the pipe 52 and is adapted to convey propane gas or other gases to provide hydrogen in the environment, the gas being under low pressure for delivery to the region of the stream feeder. The gases are brought together or mixed at the fitting 53 providing the junction for tubes 54 and 58. A valve 60 is provided for the tube or pipe 58 for regulating or controlling the flow of the propane or other hydrocarbon gas into the pipe 52 for admixing with the carbon dioxide. Disposed beneath the stream feeder and adjacent the orifice regions of the feeder are gas delivery means or distributors which, in the embodiment illustrated in FIGS. 2 and 3, comprise tubular members 64 preferably of hollow flat cross section as shown in FIGS. 2 and 3, whereby the members 64 may be accommodated between rows of glass streams from the orifices 20 in the feeder floor. It is to be understood that members having perforated or porous wall regions may be employed as gas distributors.

The tubular or hollow gas delivery members 64 are supported by the manifold 50 by tubes or tubular members 66 connected with the manifold and the members 64 as shown in FIG. 2. The gas delivery members 64 are fashioned with gas delivery outlets or passages which, in the embodiment shown in FIG. 2, are in the form of narrow slots 68 in spaced relation lengthwise of the tubular members 64, the slots being preferably in the region of the tubular members nearest to the stream feeder floor section whereby the delivered inert gas provides the nonatmospheric or isolating environment at the stream flow region embracing or encompassing the cones of glass of the streams.

The slots 68 are preferably in closely spaced relation throughout the length of the tubular members 64 coextensive with the length of the rows of orifices so as to provide for uniform distribution of the delivered gases throughout the surface areas of the stream feeder floor which would normally be subject to wetting by the glass. In carrying out the method, the feeder 14 contains heat-softened glass at a temperature preferably between 2200° F. and 2500° F. in which range the viscosity of the glass is such that glass streams readily flow through the orifices 20.

During start up operations, a bead of glass is formed at each orifice and within a comparatively short time the bead attains a weight sufficient to cause the bead to fall with a filament trailing the bead.

The operator manually draws the trailing filaments into a strand and winds a few turns of strand 28 on a packaging tube mounted on the rotatable collet 34, the collet is then rotated by a motor at a speed to attenuate the streams of glass to filaments which are collected in strand formation on the winding collet to form a package.

Prior to initiating attenuating operations, an inert or substantially nonoxidizing gas, such as carbon dioxide, and propane or other decomposable gas susceptible of evolving hydrogen are fed through the pipes 54, 58, 52, manifold 50 and tubes 66 into the gas distributors 64, the gases being under comparatively low pressure and moving at low velocities to minimize turbulence at the stream flow region.

The flow rate of the gases and the proportion of propane to the carbon dioxide are regulated by manipulation of the valves 56 and 60. The decomposable gas is fed into the isolating environment in an amount sufficient to be fully decomposed at the substrate or feeder surface so that there is preferably no excess decomposable gas delivered beyond the isolating environment into the atmosphere so that no burning of the decomposable gas ensues.

The comparatively high temperature of 2200° F. or more at the feeder floor region disturbs the chemical equilibrium or effects pyrolysis of the propane gas or other decomposable gas and the occurring reaction breaks down or decomposes such gas in the carbon dioxide or inert environment resulting in the formation or evolution of hydrogen, which is adsorbed onto the surface of the stream feeder, and the formation of pyrolytic carbon in fine particle form.

With excesses of decomposable gas, it has been visually observed that the carbon collects on the feeder surface but continuously flakes away as layers of carbon are formed by pyrolytic decomposition. The decomposition products in the carbon dioxide or isolating environment, being substantially nonwettable by glass, tend to separate or separate the glass from the surface areas of the feeder at the glass stream delivery region and hence eliminate or greatly reduce the tendency for the glass to flood. It is also believed that the decomposition products have an effect on the molten glass to an extent as to resist the tendency of the beads of glass, formed at the orifices during start up operations, to be joined as they are prone to do in a normal atmospheric environment.

The conditions in the isolating environment promote a relationship like an increased wetting angle of the glass with an adjacent surface such, for example, as an angle of 90° to 180° on a platinum substrate, or even a negative adhesion as a pushing of the glass from a platinum or platinum alloy substrate.

In the operation of the method of the invention, it has been observed during the delivery of the carbon dioxide and decomposable gas to the stream feeder region during start up in which beads of glass are formed at the orifices, the beads of glass are substantially reduced in size as compared with the size of beads formed in a normal atmospheric environment. The beads of glass acquire a visible deposit or coating of carbon or carbonaceous decomposition product which resists interadhesion of the glass of the beads so that the beads tend to remain in discrete form.

As soon as the beads of glass fall and attenuation is initiated, any carbonaceous decomposition product on the surfaces of the intensely hot cones of glass or the streams of glass, upon moving out of the isolating or nonatmospheric environment into the air, instently combines with atmospheric oxygen under the influence of the high temperatures forming water and carbon dioxide gas which is dissipated into the atmosphere. This reaction occurs without leaving a contaminate on the filaments or fibers drawn from the glass streams.

The method of the invention, wherein the tendency of the glass to wet the surface areas of the stream feeder is minimized or eliminated, enables the fashioning of a feeder floor section with a large number of stream flow orifices in closely oriented spaced relation. During bead formation at the start of attenuation, adjacent beads may be in contact one with another but are not joined. Upon falling of the beads they are in discrete form and the glass streams remain discrete or individual and each is attenuated into a filament without flooding of the glass at the stream delivery region.

The gases are delivered from the distributors 64 at a rate or in an amount which will maintain a nonatmospheric or substantially inert environment at the stream feeder region sufficient to occlude atmospheric oxygen in the zone of the decomposition products as the high temperatures would cause the carbon or carbonaceous product to combine with oxygen to form oxides.

It has been found that other gases may be utilized to provide an isolating, nonatmospheric or substantially nonoxidizing environment at a stream feeder or substrate surface in which a nonwetting condition may be established between molten glass and a feeder or substrate surface. Such gases that have been found to be satisfactory include nitrogen, helium, argon, neon and xenon where a heat-decomposable hydrocarbon is employed in the environment.

Other organic or hydrocarbon gases may be utilized which will be decomposed under the high temperatures of the molten glass to result in evolved hydrogen adsorbable onto a feeder or substrate surface at such temperatures. Among the organic gases suitable for the purpose other than propane are methane, ethane, butane, isobutane, ethylene, propylene, acetylene, cyclopropane, naphthalene and naphthanes. Such gases as methane, propane and butane are preferred as they are readily available and render the method or process more economical. The organic or hydrocarbon gases are usable in an environment of carbon dioxide. Where methane is utilized, it is found that the methane concentration should be upwards of five percent or more of the total volume of gases delivered to the stream feeder in order to obtain the desired nonwetting effect.

Tests have shown that if an excess of hydrogen is evolved at the feeder surfaces, there is a tendency for the gas to cause frothing of the glass and reduce the effectiveness of control of the glass.

Another heat-decomposable gas that has been found to be effective upon decomposition to promote separation of molten glass from a feeder or substrate surface is anhydrous ammonia ($NH_3$). Ammonia readily decomposes into hydrogen and nitrogen at the feeder surface at the temperature of the heat-softened glass, the evolved hydrogen tending to separate the molten glass from the feeder surface. Ammonia may be successfully utilized in an inert or isolating environment provided by argon or other inert gases such as helium, neon and xenon for promoting separation of glass from a substrate.

Ammonia and the several hydrocarbons mentioned herein and perhaps others may be decomposed by temperatures between about 2000° F. and 2500° F. in an inert or nonatmospheric environment and result in low surface energy condition and nonwetting characteristic.

It is found, that in order to continually maintain a nonflooding condition or environment at the feeder, the gases providing the environment must be delivered substantially continually to the stream flow region of the feeder. Where a hydrocarbon gas is utilized in the environment, the pyrolytic decomposition products are of fugitive character, and if the isolating or inert environment becomes insufficient to occlude oxygen from the stream flow region of the feeder, the decomposition products and oxygen under the high temperatures combine to form oxides of carbon and hydrogen.

It is also found that hydrogen in an inert environment such as argon gas, at the temperature of the molten glass, is adsorbed by platinum or a platinum substrate surface and provides an interfacial condition or "gas cushion effect" tending to separate or separating the glass from the substrate surface.

It is found that a comparatively small percentage of hydrocarbon gases in the inert isolating or nonatmospheric environment is effective to establish an interfacial nonwetting characteristic at the feeder surface, and the percentage of hydrocarbon gas should preferably be between one-half per cent and five percent of the total volume of the delivered gases.

It is found by tests that at higher temperatures well above the attenuating temperatures of "E" glass the products, resulting from thermal decomposition of the hydrocarbon gas, become less effective as nonwetting media at the stream feeder region of the feeder. The interfacial condition tending to effect a separation of the glass was effective up to a temperature of about 2650° F., and above this temperature the effectiveness of the interfacial condition to reducing flooding was substantially reduced. However, within the usual temperature of the glass in the feeder, viz between 2200° F. and 2500° F. the method was effective to prevent or substantially eliminate glass flooding over the feeder surface at the region of the stream flow orifices.

The distributors 64 are fashioned of metal, such as copper and the gases are fed to the distributors at about room temperature and preferably below 200° F., the gases at these temperatures maintaining the metal of the distributors in a comparatively cool condition. The gases delivered to the region of the cones of glass absorb heat from the glass thus raising the viscosity of the glass of the cones for efficient attenuation of the glass streams to continuous filaments.

FIGS. 4 and 5 illustrate the method of the invention utilized for establishing the environment for preventing flooding of glass at the stream delivery region of a feeder having orifices in a planar floor section. In this form the feeder 70 is fashioned with a floor section 72 having a planar obverse surface 74.

The floor section is provided with rows of orifices 76 formed as drilled openings or passages in the planar floor 72 whereby the outlets of the orifices are at the planar surface 74. In this form, the gas distributors 64' are arranged between rows of orifices 76 and are fashioned with delivery passages or slots 68' for delivering a mixture of a substantially inert or nonoxidizing gas and a hydrocarbon gas or other gas such as ammonia from a manifold 50' in the manner hereinbefore described in reference to FIGS. 2 and 3, the gases being controlled by adjustable valve means of the character illustrated in FIG. 1.

The gases are delivered at low velocities through the passes or slots 68' to provide the inert or nonatmospheric environment adjacent the obverse planar surface 74 of the feeder and encompassing the cones of glass the hydrocarbon gas or ammonia decomposed by heat from the glass and feeder to establish nonwetting characteristics hereinbefore described.

As shown in FIGS. 4 and 5, the distributors 68' are preferably arranged in parallel relation adjacent to and on opposite sides of the rows of glass streams 22' at the region of the cones of glass 24'.

While in the forms illustrated in FIGS. 2 through 5, a gas distributor is arranged between the rows of glass streams, it is to be understood that several rows of streams delivered from corresponding rows of orifices may be disposed between each pair of gas distributors. The method of establishing and maintaining the substantially inert or nonoxidizing environment containing a decomposable gas at the region of the delivery of the streams from the orifices 76 is the same as hereinbefore described.

FIG. 6 illustrates a modified form of apparatus for carrying out or performing the method of the invention. In this form the feeder 80 is fashioned with a floor 82 of planar character having an planar obverse surface 84. The feeder floor is provided with a comparatively large number of glass flow orifices 86 arranged in closely spaced relation in multiple rows whereby a large number of glass streams may be delivered from a comparatively small area of the feeder floor. Disposed adjacent the feeder floor and at opposite sides of the streams from the orifices 86 are flattened tubular or hollow members 90.

The tubular members 90 are connected with a manifold or header 92 adjacent one end of the feeder 80, the manifold being connected with a supply of substantially inert gas such as carbon dioxide by a pipe 91, and with a supply of hydrocarbon gas by a pipe 93. The supply pipes are provided respectively with control valves 95 and 96 for regulating or controlling the proportion of hydrocarbon gas to the inert or isolating gas.

The tubular members 90 are provided with spaced slots or passages 94 of the general character of the passages 68 shown in FIG. 2 arranged in spaced relation lengthwise of the members and through which the mixture of gases is delivered into the stream flow region of the feeder floor 82 whereby the inert gases provide an inert or nonoxidizing environment enveloping the feeder floor 84 and the cones of the glass streams delivered through the orifices 86. The hydrocarbon gas component in the inert environment decomposed by the intense heat from the feeder and the glass streams to promote separation of the glass from the feeder surface and thereby reduce or substantially eliminate the tendency for the glass to flood over the surface 84 of the stream feeder as well as to prevent or retard juncture or cohesion of adjacent beads of glass formed at the orifices during start-up of attenuating operations. The arrangement shown in FIG. 6 provides a large number of orifices 86 in a small area of the feeder floor and flooding is prevented or minimized by the nonwetting characteristics provided by the products resulting from pyrolytic decomposition.

Figure 7:
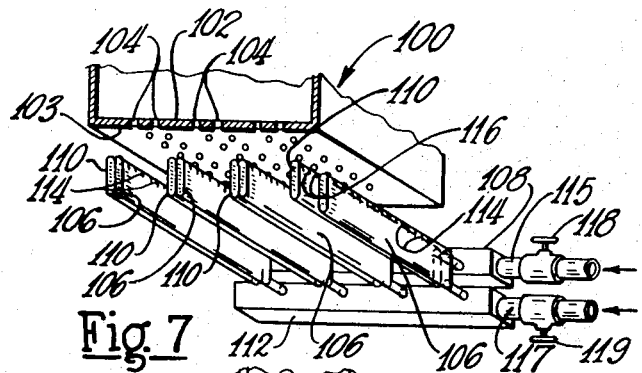
FIG. 7 is an isometric view similar to FIG. 2 illustrating a modified form of apparatus for carrying out the method of the invention.

FIG. 7 illustrates a form of apparatus for carrying out the method of the invention wherein the substantially inert gas and the hydrocarbon gas or other carbonaceous material are delivered from separate or independent distributors into the stream delivery region of a feeder. In this form, the feeder or bushing 100 is provided with a floor section 102 fashioned with rows or groups of orifices 104 through which streams of glass flow from the glass supply in the feeder 100. Disposed beneath and adjacent the feeder floor section are two groups of distributors.

One group of distributors 106 is connected with a manifold 108 and a second group of distributors 110 is connected with a second manifold 112. The distributors are arranged in pairs, each pair of distributors 106 and 110 being disposed between groups of the glass streams. The inert gas, such as carbon dioxide, argon or the like is conveyed from a supply by a pipe 115 through manifold 108 and delivered through slots or passages 116 in each of the distributors 110 to provide the inert or nonatmospheric environment adjacent the stream flow region of the feeder.

The manifold 112 is connected by a pipe 117 with a supply of hydrocarbon gas which is delivered through slots or passages 114 in the distributors 106 into the environment provided by the inert gas delivered from the distributors 110. The gases delivered through the pairs or groups of distributors are controlled by valves 118 and 119 of conventional character to regulate the proportions of inert gas and hydrocarbon gas delivered concomitantly but separately by the pairs of distributors into the stream flow region.

In this arrangement the inert gas provides the nonoxidizing or isolating environment for the hydrocarbon gas, the latter being decomposed by the heat from the feeder and glass streams resulting in decomposition products providing the nonwetting condition minimizing or eliminating flooding of the glass at the stream delivery region of the feeder.

Figure 8:
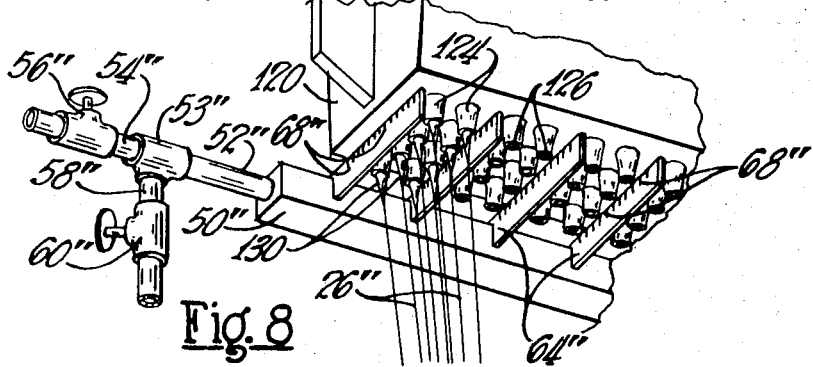
FIG. 8 is an isometric view of a portion of another form of stream feeder and an arrangement for establishing a nonwetting environment at the stream delivery region.

FIG. 8 illustrates a portion of a stream feeder of a character having orificed projections or tips depending from the feeder floor or floor section for flowing streams of glass and an arrangement for establishing an environment at the stream delivery region promoting separation of the heat-softened glass from the exterior surface of the projections and the feeder floor. The stream feeder 120 is of preferably rectangular shape fashioned of platinum, or an alloy such as platinum and rhodium. The floor 122 of the feeder is provided with rows of depending projections 124, the rows of projections on a rectangularly-shaped feeder being arranged transversely on the feeder floor, as illustrated in FIG. 8.

The feeder 120 contains heat-softenable filament forming material such as glass and is heated by electric current flowing through the feeder in a well known conventional manner. Each of the projections is fashioned with a glass flow passage terminating in a delivery orifice 126 at the lower end of each projection or tip. Streams of glass flow from the orifices, the cones 130 of glass being illustrated at the delivery regions of the orifices. The streams of glass may be attenuated into filaments 26" by winding the filaments into a package in the manner illustrated in FIG. 1.

A means similar to that shown in FIG. 2 is employed for feeding or delivering gases to the region of glass stream delivery and the feeder floor area including the depending orificed projections. Disposed adjacent the stream feeder 120 is a manifold 50" provided with a gas supply pipe 52". The pipe 52" is connected through a fitting 53" with a pipe 54" which receives a gas from a supply (not shown) for establishing an isolating, substantially nonoxidizing environment at the floor of the feeder.

An adjustable valve 56" is provided for regulating the delivery of gas through the pipe 54". A pipe 58" is connected through the fitting 53" with the pipe 52" and is adapted to convey hydrogen or other gas which is decomposable to provide hydrogen in the environment. A valve 60'' is provided for the pipe 58'' for regulating gas flow through the pipe 58'', the gases being mixed at the fitting 53''.

Disposed beneath the floor 122 and adjacent the transverse rows of orificed projections 124 are gas delivery means, preferably in the form of tubular members 64'', one end of each of the members being connected with the manifold 50''. The members 64'' as illustrated are of hollow flat cross-section whereby the members 64'' are accommodated between transverse rows of glass streams delivered from the orifices 126 of the projections or tips. The gas delivery members 64'' are joined with the manifold in a manner to receive gases from the manifold.

The members 64'' are provided with gas delivery outlets or passages 68'' preferably in the form of narrow slots spaced lengthwise of the members, the outlets or slots 68'' being disposed in the region of the tubular members nearest to the stream feeder floor section whereby the delivered gases embrace or encompass the cones of glass of the streams, the projections 124 and the floor section 122 of the feeder. In this arrangement the gas is delivered from the outlets or slots 68'' providing for substantially uniform distribution of the delivered gases throughout the surface areas of the stream feeder floor section and projections.

The functioning of the arrangement shown in FIG. 8 is substantially the same as the functioning of other arrangements hereinbefore described. An inert gas such as carbon dioxide, argon or the like is delivered from a supply to the pipe 54'' to provide the nonatmospheric or isolating environment, and hydrocarbon gas or other heat-decomposable carbonaceous gas is delivered from a supply through the pipe 58''. The valves 56'' and 60'' are adjustable and control or regulate the amounts or proportions of the gases distributed through the outlets or slots 68'' in the members 64''. The products of heat decomposition of the noninert gas or gases in the isolating environment promote nonwetting conditions at the feeder floor area to substantially eliminate flooding or spreading of the glass over the surfaces of the feeder floor and projections embraced within the isolating environment.

It is found by tests that the pyrolytic decomposition of a carbonaceous gas results in a form of a dynamically balanced or transient layer of carbon fostering or promoting separation of the molten glass from a substrate or glass feeder surface to restrict or substantially eliminate flooding of the glass over the substrate or feeder surface. The dewetting or nonflooding condition attained at the interfacial region of glass with the substrate or feeder surface is believed to be dependent in a measure on the difference in the surface energies of the glass and the substrate or feeder surface and the surface energy of the carbon.

Carbon has a comparatively low surface energy and, as the molten glass and the material of the substrate or feeder surface have higher surface energies, it is found that utilizing a stabilizing or isolating environment embracing the interfacial region of the substrate or feeder surface with the glass and which is compatible with the carbonaceous material, carbon derived from the carbonaceous material is of a form or is endowed with characteristics promoting separation of the glass from the substrate or feeder surface, that is, the glass does not tend to wet the substrate or feeder surface where carbon is present at the interface of the glass with the substrate or feeder surface.

In the process, carbon is continuously being formed at the interface of the substrate and the molten glass and is being continuously dispersed without a build-up of carbon at the interface. This action is referred to above as a dynamically balanced or transient layer of carbon.

The material of the substrate or feeder is of a sufficiently high temperature of fusion to contain the molten mineral material or glass. The pyrolytic decomposition of a carbonaceous material in the stabilizing or isolating environment, which is compatible with the carbonaceous material, at the substrate or feeder surface results in effecting the deposition of a comaratively thin layer of film or carbon at the interface of the glass with the substrate surface, the carbon deposit being of a dynamic or fugitive character.

It is found that the carbon resulting from pyrolytic decomposition of the carbonaceous material does not tend to build up or accumulate on the substrate or feeder surface but the excess carbon continuously flakes away or is dispersed in the inert or inactive gas and conveyed away from the substrate surface by the inert or inactive gas.

The inert or inactive gas is continuously dispersed into the atmosphere and the dynamic carbon entrained in the inert gas is dispersed into the atmosphere and, under the high ambient temperatures, combines with oxygen to form carbon dioxide. The method of the invention of providing a thin layer or deposit of dynamic carbon at the feeder or substrate surface through the pyrolytic decomposition of carbonaceous material is very effective to promote separation of the glass from the substrate surface without imparing glass stream flow. The method involving continuous deposition and removal of the excess carbon away from the substrate surface promotes the successful functioning of the method of effecting separation of the glass from the substrate surface.

The thin layer or film of carbon deposited at the interface of the glass with the substrate surface or feeder functions as a separating agent or medium effective in establishing antiwetting characteristics reducing or preventing the tendency for the glass to flood over the substrate or feeder surface.

It is found in the use of the method of the invention that beads of viscous glass, formed at the stream flow orifices pursuant to filament break-outs, tend to remain discrete or do not adhere or stick together even though they are in contact one with another. It is believed that an infinitely thin film of carbon is deposited on the surfaces of the beads of glass as well as on the substrate surface. It is found that where the amount of decomposable carbonaceous gas is increased, the beads of glass visually exhibit a gray cloudy appearance evidencing the presence of carbon.

It is found that the method or system of the invention is effective to promote separation of glass from surfaces of substrates or stream feeders of materials other than platinum and alloys of platinum. A feeder or substrate surface of an alloy of nickel and tungsten has been employed in conjunction with an inactive or inert gas environment of carbon dioxide gas and a carbonaceous material, such as propane gas, in the carbon dioxide gas, this alloy having a higher surface energy than that of carbon.

The propane gas is decomposed by the heat in the region of the molten glass and at the substrate providing hydrogen and carbon at the interface of the glass with the substrate surface of the alloy of nickel and tungsten and the carbon is found to be effective to promote separation of the glass from the substrate and flooding of the substrate surface by the glass substantally eliminated. The alloy employed is approximately ninety percent nickel and ten percent tungsten. In the operation of this method providing separation of the glass from the substrate, a very thin film or deposit of carbon is visible on the substrate surface.

A substrate or stream feeder of an alloy comprising approximately sixty-five percent nickel and thirty-five percent chromium has been found to be usable with the method of the invention and attain separation of the glass from the surface of the feeder having stream delivery orifiices. This alloy has a higher surface energy than the surface energy of carbon and has a sufficiently high temperature of fusion to contain the molten glass.

A stream feeder or substrate of this alloy has been employed in flowing glass streams into an inactive or inert gas environment of carbon dioxide containing a carbonaceous material, such as propane gas. The propane gas is decomposed by the heat from the molten glass and from the feeder providing a thin deposit of carbon at the interface of the glass with the feeder surface and, it is found that the glass separates from the feeder surface and flooding of the surface is substantially eliminated.

The gas system or method of the invention utilized with a stream feeder or substrate of ceramic material for flowing streams of glass is found to promote separation of the glass from the stream flow surface area of the feeder. The stream feeder utilized with the method is fashioned of zirconia (zirconium oxide), the surface energy of zirconia being higher than the surface energy of carbon. In the use of the method with the stream feeder of zirconia, carbon dioxide gas is utilized to provide the stabilizing or isloating environment at the stream flow region of the feeder, and the carbonaceous material, propane gas, is delivered into the carbon dioxide environment. The heat from the feeder and from the molten glass decomposes the propane gas into carbon and hydrogen and results in a thin film or deposit of carbon on the feeder or substrate surface which effects separation of the glass from the substrate surface and flooding substantially eliminated.

It is found that the method or system of the invention employing a heat-decomposable carbonaceous gas other than a hydrocarbon gas has been found effective to promote separation of glass from the surface of a substrate or stream feeder. A stabilizing or isolating environment is provided by feeding nitrogen gas to the stream flow region of an orificed feeder of an alloy of platinum and rhodium. A head of molten glass equivalent to thirty inches of water is contained in the feeder. A heat-decomposable gas, viz. carbon tetrachloride, is fed into the isolating environment provided by the nitrogen gas. The temperature of the glass in the feeder is 2350° F. and, it is found that the carbon tetrachloride decomposes under the heat providing carbon deposited on the orificed surface of the stream feeder at the interface with the glass.

It is found that the glass is effectively separated from the feeder surface and flooding of the surface is substantially eliminated. The carbon tetrachloride in a gaseous state is provided in the inactive or stabilizing nitrogen gas environment in the ratio to the nitrogen gas in a range of from about ten percent to forty percent by volume. In conducting the operation, it is found that at about ten percent by volume of carbon tetrachloride, separation is effected but that upon increasing the percentage of carbon tetrachloride in the nitrogen gas environment, separation of the glass at the interface with the stream feeder is accelerated and flooding completely eliminated. While nitrogen gas at the region of the substrate or stream feeder surface is compatible with the carbon tetrachloride, other stabilizing environments may be provided which are suitable for the purpose of promoting deposition of carbon at the interface of the glass with the substrate or feed surface.

Carbon monoxide is effective to promote separation of glass from the substrate surface. At the elevated temperature of the stream feeder, the carbon monoxide decomposes or disproportionates the carbon and carbon dioxide providing carbon deposited on the orificed surface of the stream feeder. The carbon dioxide may be included with the carbon monoxide to dilute the effect or disproportioning of the carbon monoxide thus stabilizing the environment to the desired rate of carbon deposition. It is also found that Freon (dichlorodifluoromethane) in the high temperature environment of the molten glass is decomposable to form carbon as an antiwetting agent.

A stabilizing or isolating environment is provided by inert or inactive gases hereinbefore mentioned such as nitrogen, helium, argon, neon and xenon which are compatible with the carbonaceous gases. A stabilizing or isolating environment may be provided by a liquid medium, such as water, disposed to maintain the carbonaceous material at the region of the feeder or substrate surface, or an enclosure for the substrate or feeder surface at which glass is present may be employed to provide a stabilizing environment to effect the deposition of carbon at the interface and thereby promote separation of the glass from the substrate or feeder surface to reduce or eliminate glass flooding over the surface.

To promote the dewetting condition, pure hydrogen may be supplied as the treating gas in the region of the molten material, or hydrogen may be supplied as a constituent of a gas which is decomposable at the high temperatures of the region of the molten material. The treating gas, such as hydrogen and/or carbon-containing gas may be supplied to a region which is shielded, such as by a surrounding shroud or tube, or the treating gas can be supplied within a shield comprising an envelope of other gas, such as carbon dioxide, nitrogen, argon or the like which is inactive at the temperature of the molten material.

It has been found that molten glass on a surface which it will wet out can be made to agglomerate or in another sense can be caused to pull itself together or "ball up" upon introduction of the treating gas into the region of the molten glass. This dewetting effect may be made to occur with glass present on an underlying surface or glass adhered to an overlying or a laterally adjacent surface. The effect is of particularl utility in overcoming problems of adherence of glass to surfaces such as are encountered in sheet forming processes like the float glass process. A gas having the dewetting characteristics may be supplied through porous side walls such as those illustrated in the float glass process in U.S. Pat. 3,489,543. The effect is also applicable in processes such as the updraw process for formation of glass fibers illustrated in U.S. Pat. 2,225,667 or for the formation of ribbons, sheets, film or flakes of glass.

When such molten glass floods a surface, such as an orificed surface of a stream feeder for formation of fibers, the glass can be caused to unflood or pull itself together to the orificed areas and away from the surface portions of the feeder by the introduction of the treating gas to the flooded surface. Beads of glass are thus formed at the orifices and depending upon the feeder design, the orifice size and head on the molten glass, discrete beads of glass can thereupon be made to fall by reason of the action of the nonwetting agent.

As indicated above, carbon is one of only a few materials which is not readily wet out by glass. According to the present invention, this characteristic can be imparted to other materials, such as metals and nonmetallic refractories by introducing a treating gas for supply of a layer or film of carbon over the substrate material. Where such a layer is fugitive or transient at the high temperatures to which it may be subjected, it can be replenished or maintained by continuous or intermittent supply of the treating gas to the surface. Where the substrate is of carbon or graphite, a carbonaceous treating gas may be used to replenish or maintain the character of the substrate surface such as where wear or constituents in the environment might act to remove carbon from the surface. This method of substrate treatment preservation can be used in processes where molds are used for shaping of glass products or where glass is supplied to form products such as sheets of glass in the float glass process.

It is apparent that, within the scope of the invention, modifications and different arrangements may be made other than as herein disclosed, and the present disclosure is illustrative merely, the invention comprehending all variations thereof.

I claim:
1. The method of processing heat-softened fiber-forming mineral material comprising establishing a substantially nonoxidizing environment by feeding an inert gas onto a surface of a substrate containing platinum and having orifices from which flow streams of the heat-softened mineral material, feeding a gas in the environment which at the temperature of the heat-softened material is decomposed to provide hydrogen, and adsorbing the hydrogen into the platinum in an amount effective at the interfacial region of the material with the substrate to reduce the wetting effect of the material and promote separation of the heat-softened mineral material from the surface.

2. The method of processing heat-softened glass comprising feeding an inert gas to the glass stream flow region of a stream feeder of an alloy containing platinum to isolate the stream flow region from the atmosphere, establishing in the inert gas a heat-decomposable gas which at the temperature of the heat-softened material is decomposed to provide hydrogen, adsorbing the hydrogen into the platinum alloy in an amount effective at the surface of the feeder at the stream flow region to reduce the wetting effect of the glass and promote separation of the glass at the surface, and controlling the proportion of the heat-decomposable gas in the inert gas so that there is substantially no decomposable gas delivered beyond the region of the inert gas.

3. The method according to claim 2 wherein the inert gas is selected from the group carbon dioxide, nitrogen, helium, argon, neon and xenon.

4. The method according to claim 2 wherein the heat-decomposable gas is a hydrocarbon.

5. The method according to claim 2 wherein the heat-decomposable gas is selected from the group comprising methane, ethane, propane, butane, isobutane, ethylene, propylene, acetylene, cyclopropane, naphthalene, naphthane, and ammonia.

6. The method of processing heat-softened glass comprising flowing streams of glass from orifices in a surface of a stream feeder of an alloy containing platinum, establishing an inert gaseous environment substantially isolating the orificed surface of the stream feeder from the atmosphere, delivering a heat-decomposable material in the environment, decomposing the material to provide hydrogen by heat from the feeder in the environment and adsorbing the hydrogen by the platinum alloy surface of the feeder in an amount effective to reduce the wetting effect of the glass and promote separation of the glass at the interfacial region with the surface.

7. The method according to claim 6 wherein the heat-decomposable material is a hydrocarbon gas and the percentage of the hydrocarbon gas is in a range between one-half percent and five percent of the total volume of gases constituting the environment.

8. The method of treating a surface of a body of an alloy containing platinum at which heat-softened glass is present comprising substantially isolating the surface from the atmosphere by maintaining an inert gas and a heat-decomposable gas at the surface of the body, heating the surface to maintain the glass in a mobile condition, subjecting the gas of the environment to the heat to decompose the decomposable gas to provide hydrogen in the environment, and adsorbing the hydrogen into the platinum alloy in an amount effective at the surface to reduce the wetting effect of the glass and promote separation of the glass from the surface.

9. The method of treating an orificed surface of a body containing platinum from which flow streams of heat-softened glass comprising substantially isolating the surface from the atmosphere by a substantially nonoxidizing gas containing a heat-decomposable gas, heating the surface to maintain the glass in a heat-softened condition, subjecting the decomposable gas to the heat to effect pyrolytic decomposition of the decomposable gas forming decomposition products including hydrogen, and adsorbing the hydrogen into the platinum alloy in an amount effective at the surface to promote separation of glass from the surface.

10. The method of substantially eliminating the tendency for heat-softened glass to flood the surface of a feeder of an alloy containing platinum having a pulrality of orifices through which flow streams of the glass for attenuation to fibers comprising feeding carbon dioxide to the stream delivery region of the surface at a rate to effectively isolate the orificed surface from the atmosphere, feeding a heat-decomposable hydrocarbon gas into the carbon dioxide environment, subjecting the hydrocarbon gas in the environment to heat from the glass which is at a temperature in a range of from 2200° F. to 2500° F. to decompose the hydrocarbon gas into hydrogen and carbon at the orificed surface of the feeder, adsorbing the hydrogen into the surface of the platinum alloy and depositing carbon of a fugitive nature on the surface of the platinum alloy effective to promote separation of the glass from the surface, the hydrocarbon gas being continuously fed to the carbon dioxide environment at a rate to perpetuate the evolution of hydrogen by decomposition of hydrocarbon gas at the surface and continuously replace the fugitive carbon to maintain a layer of carbon at the surface.

11. The method of controlling heat-softened glass comprising flowing a stream of molten glass adjacent a limited area of a surface of a body of an alloy containing platinum which normally would be wetted by the glass to such an extent that at the temperature of the glass in contact with the limited area, the glass would spread over the surface beyond the limited area, temporarily treating the surface with hydrogen in an inert gaseous environment at the surface to render the surface substantially nonwettable by the heat-softened glass to an extent that the glass does not spread over the surface beyond the limited area, and maintaining the treatment of hydrogen at the surface so long as the glass flows adjacent the limited area.

12. The method of processing heat-softened fiber-forming mineral material involving a substrate provided with a hydrogen-adsorbable surface and having orifices from which flow streams of the heat-softened mineral material, feeding an inert gas to the stream flow region of the surface, establishing in the inert gas a heat-decomposable gas which at the temperature of the heat-softened material is decomposed to provide hydrogen, and adsorbing the hydrogen into the surface in an amount effective at the interfacial region of the heat-softened mineral material with the surface to reduce the wetting effect of the mineral material and promote separation of the material from the surface.

13. The method of processing heat-softened fiber-forming mineral material involving a substrate having a surface containing platinum and having orifices from which flow streams of the heat-softened material, feeding an inert gas to the stream flow region of the surface, establishing in the inert gas a heat-decomposable material which at the temperature of the heat-softened mineral material is decomposed to provide hydrogen, and absorbing the hydrogen into the surface to an extent effective at the interfacial region of the heat-softened mineral material with the surface to reduce the wetting effect of the mineral material and promote separation of the mineral material from the surface.

14. The method of processing heat-softened glass involving a body provided with a hydrogen-adsorbable surface and having orifices from which flow streams of the glass, establishing an inert environment substantially isolating the orificed region from the atmosphere, feeding a heat-decomposable material to the environment, decomposing the material to provide hydrogen in the environment, and adsorbing the hydrogen into the surface in an amount effective to reduce the wetting effect of the glass and promote separation of the glass at the interfacial region with the surface.

15. The method of controlling heat-softened glass involving flowing a stream of the heat-softened glass adjacent a limited area of a surface of a body which normally would be wetted by the glass to such an extent that at the temperature of the glass in contact with the limited area, the glass would spread over the surface beyond the limited area, temporarily treating the surface with hydrogen in an inert gaseous environment to render the surface substantially nonwettable by the heat-softened glass to an extent that the glass does not spread over the surface beyond the limited area, and maintaining the treatment of hydrogen at the surface so long as the glass flows adjacent the limited area.

16. The method of processing heat-softened mineral material involving a substrate provided with a metallic surface and having orifices from which flow streams of the mineral material, establishing an inert gaseous environment substantially isolating the stream flow region from the atmosphere, feeding a heat-decomposable material to the environment, decomposing the heat-decomposable material in the environment by heat to provide a gas adsorbable by the metallic surface, and adsorbing the gas by the metallic surface in an amount effective to reduce the wetting effect of the mineral material and promote separation of the mineral material at the interfacial region with the metallic surface.

17. The method of controlling molten glass at a surface of a substrate having a higher surface energy than the surface energy of carbon and of sufficiently high temperature of fusion to withstand molten glass including flowing streams of glass through orifices in the substrate surface, establishing an isolating environment at the orificed surface of the substrate, supplying a gas in the isolating environment which at the temperature of the molten glass is decomposable to provide carbon, decomposing the decomposable gas providing carbon at the interfacial region of the glass with the orificed substrate surface to reduce the wetting effect of the glass on the substrate surface and promote separation of the glass from the surface, and attenuating the streams of glass to fibers.

18. The method of controlling heat-softened glass comprising flowing streams of glass from orifices in a surface of a stream feeder which surface tends to be wetted by molten glass, feeding an inert gas onto the orificed surface providing an inactive environment substantially isolating the orificed surface, supplying a heat-decomposable carbonaceous material in the inactive environment, decomposing the material by heat from the feeder and the glass providing carbon at the interface of the orificed feeder surface with the glass in an amount effective to reduce the wetting effect of the glass and promote separation of the glass at the interfacial region with the surface, and attenuating the streams of glass to fibers.

19. The method according to claim 18 wherein the heat-decomposable carbonaceous material is a hydrocarbon gas.

20. The method of controlling heat-softened glass including flowing streams of the glass from orifices in a stream feeder surface which surface tends to be wetted by heat-softened glass, supplying carbon dioxide to the stream flow region of the orificed feeder surface providing an isolating environment at the region, supplying a decomposable carbonaceous gas in the carbon dioxide environment, decomposing the decomposable carbonaceous gas by heat from the glass and the feeder providing carbon on the orificed surface of the feeder at the stream flow region to reduce the wetting effect of the glass at the feeder surface and promote separation of the glass from the surface, and attenuating the streams of glass to fibers.

21. The method of substantially eliminating the tendency for heat-softened glass to flood the surface of a feeder having a plurality of orifices through which flow streams of the glass for attenuation to fibers including providing a medium at the stream delivery region of the surface establishing a nonoxidizing environment at the orificed surface and stream flow region, supplying a carbonaceous gas in the nonoxidizing environment, decomposing the carbonaceous gas in the environment by heat from the glass and the feeder to deposit a layer of transient carbon on the orificed surface effective to reduce the tendency of the glass to flood the orificed surface by promoting separation of the glass from the surface, the carbonaceous gas being supplied to the environment in an amount to effect replacement of the transient carbon to maintain carbon at the orificed surface, and attenuating the streams of glass to fibers.

22. The method of substantially eliminating the tendency for heat-softened glass to flood the surface of a feeder of an alloy containing platinum having a plurality of orifices through which flow streams of the glass for attenuation to fibers comprising feeding an inactive gas to the stream delivery region of the surface at a rate providing an isolating environment at the orificed surface, feeding a heat-decomposable carbonaceous gas into the isolating environment, subjecting the carbonaceous gas in the environment to heat from the glass which is at a temperature in a range of from 2200° F. to 2500° F. to decompose the carbonaceous gas to provide carbon of a fugitive character, depositing the carbon on the orificed surface of the feeder effective to reduce the tendency for the glass to flood the surface, the carbonaceous gas being fed to the isolating environment in an amount to replace the fugitive carbon to maintain a dynamically balanced layer of carbon at the surface, and attenuating the streams of glass to fibers.

23. A method of producing continuous fibers of glass comprising delivering a plurality of fiber streams of heat-softened glass from a feeder, establishing an isolating environment embracing the streams, supplying to the isolating environment a carbonaceous gas decomposable at the temperature of the heat-softened glass, decomposing the carbonaceous gas and providing carbon on the exposed surfaces of the feeder surrounding the streams confining the delivery regions of said streams, in an amount to reduce the wetting effect of the glass and promote separation of the glass from the surfaces, and attenuating the fiber streams to fibers.

24. The method of controlling heat-softened glass at a surface of a substrate including flowing streams of glass from orifices in the substrate surface, establishing an isolating environment at the orificed surface of the substrate, delivering a carbonaceous gas in the region of the orificed surface of the substrate, elevating the temperature of the carbonaceous gas, deriving carbon from the carbonaceous gas, and depositing the carbon at the interface of the substrate surface with the heat-softened glass in an amount effective to promote separation of the heat-softened glass from the substrate surface.

25. The method of controlling heat-softened glass including establishing in a region of a surface of a substrate having orifices from which flow streams of the glass an environment substantially isolating the orificed region of the surface, and supplying to the environment a constituent in gaseous form which at the temperature of the heat-softened glass is decomposed to provide carbon on the surface in an amount effective to promote separation of the heat-softened glass from the orificed surface at the interfacial region.

26. The method of controlling molten glass at a surface of a substrate having orifices from which flow streams of glass comprising supplying an inactive gas and a carbonaceous gas at the orificed surface of the substrate substantially isolating the surface, decomposing the carbonaceous gas to provide carbon, and depositing carbon at the interface of the substrate surface with the glass in an amount effective at the surface to reduce the wetting effect of the glass and promote separation of the glass from the surface.

27. The method according to claim 26 wherein the inactive gas is selected from the group comprising carbon dioxide, nitrogen, helium, argon, neon and xenon.

28. The method of controlling molten glass at a surface of a substrate having orifices from which flow streams of the molten glass comprising establishing an isolating environment at the orificed surface of the substrate, supplying a decomposable carbonaceous gas in the environment, and decomposing the carbonaceous gas to deposit carbon at the interface of the substrate surface with the molten glass in an amount effective to promote separation of the molten glass from the surface.

29. The method according to claim 28 wherein the substrate is selected from a group comprising platinum, an alloy of platinum, an alloy of nickel and tungsten, an alloy of nickel and chromium, and zirconia.

30. The method according to claim 28 wherein the carbonaceous gas is selected from the group comprising methane, ethane, propane, butane, isobutane, ethylene, propylene, acetylene, cyclopropane, naphthalene, naphthane, carbon tetrachloride, carbon monoxide and dichlorodifluoromethane.

31. The method of controlling heat-softenend mineral material including establishing an isolating environment at a surface of a substrate having orifices from which flow streams of the mineral material, supplying a carbonaceous gas in the environment which is decomposable at the temperature of the heat-softened mineral material, decomposing the carbonaceous gas providing a thin deposit of carbon at the interfacial region of the mineral material with the orificed substrate surface to reduce the wetting effect of the mineral material and promote separation of the mineral material from the surface, and conveying away the carbon in excess of that providing the thin deposit preventing carbon build-up on the substrate surface.

References Cited

UNITED STATES PATENTS

| | | | |
|---|---|---|---|
| 3,083,550 | 4/1963 | Auerback | 65—3 |
| 3,332,763 | 7/1967 | Basler et al. | 65—994 |
| 3,489,543 | 1/1970 | Kita et al. | 65—25 R |
| 3,658,979 | 4/1972 | Dunn et al. | 164—82 X |
| 3,276,853 | 10/1966 | Eakins | 65—3 |
| 2,252,689 | 8/1941 | Bradshaw | 65—11 W |

ROBERT L. LINDSAY, JR., Primary Examiner

U.S. Cl. X.R.

65—12, 25 R, 32; 264—176 F